United States Patent [19]

Zeigner et al.

[11] 4,286,683
[45] Sep. 1, 1981

[54] STOP/START CONTROL SYSTEM FOR ENGINE

[75] Inventors: Willard L. Zeigner, San Ramon; Peter G. Blaney, Walnut Creek, both of Calif.

[73] Assignee: Zemco, Inc., San Ramon, Calif.

[21] Appl. No.: 68,098

[22] Filed: Aug. 20, 1979

[51] Int. Cl.³ ............................................. B60K 15/00
[52] U.S. Cl. .................................. 180/54 R; 73/113; 123/179 B; 290/38 E; 307/10 R; 364/442
[58] Field of Search ............. 180/271, 272, 313, 54 R; 290/30 R, 38 C, 38 E; 340/52 R, 56; 123/179 B, 179 BG, 179 A, 198 F, 198 DB, 198 DC; 364/442; 73/113, 114; 307/10 R

[56] References Cited

U.S. PATENT DOCUMENTS

| | | | |
|---|---|---|---|
| 2,580,080 | 12/1951 | Dewhirst | 182/271 X |
| 3,252,322 | 5/1966 | Pring | 73/113 |
| 3,862,429 | 1/1975 | Bucher | 123/179 B X |
| 4,022,164 | 5/1977 | Fuchs | 123/198 F X |
| 4,179,740 | 12/1979 | Malin | 364/442 |
| 4,188,618 | 2/1980 | Weisbart | 364/442 X |
| 4,192,279 | 3/1980 | Maisch et al. | 123/179 A X |

Primary Examiner—Joseph F. Peters, Jr.
Assistant Examiner—Donald W. Underwood
Attorney, Agent, or Firm—Owen, Wickersham & Erickson

[57] ABSTRACT

A system is disclosed for automatically controlling the shutdown and restarting of a vehicle engine in order to conserve fuel at times when the vehicle would be otherwise stopped, with the engine running at idle speed and including in combination, an accumulator for computing and displaying the amount of fuel saved during shutdown. A central control comprised of an auto shutdown logic section and an auto start time delay logic section is connected to signal producing components on the vehicle and its engine and provides outputs to control engine shutdown and restart. The accumulating device utilizes an idle fuel flow reference with a clock input to compute the amount of fuel saved, which is indicated on the attached display. The logic functions of the accumulator are accomplished by a programmed microprocessor.

4 Claims, 6 Drawing Figures

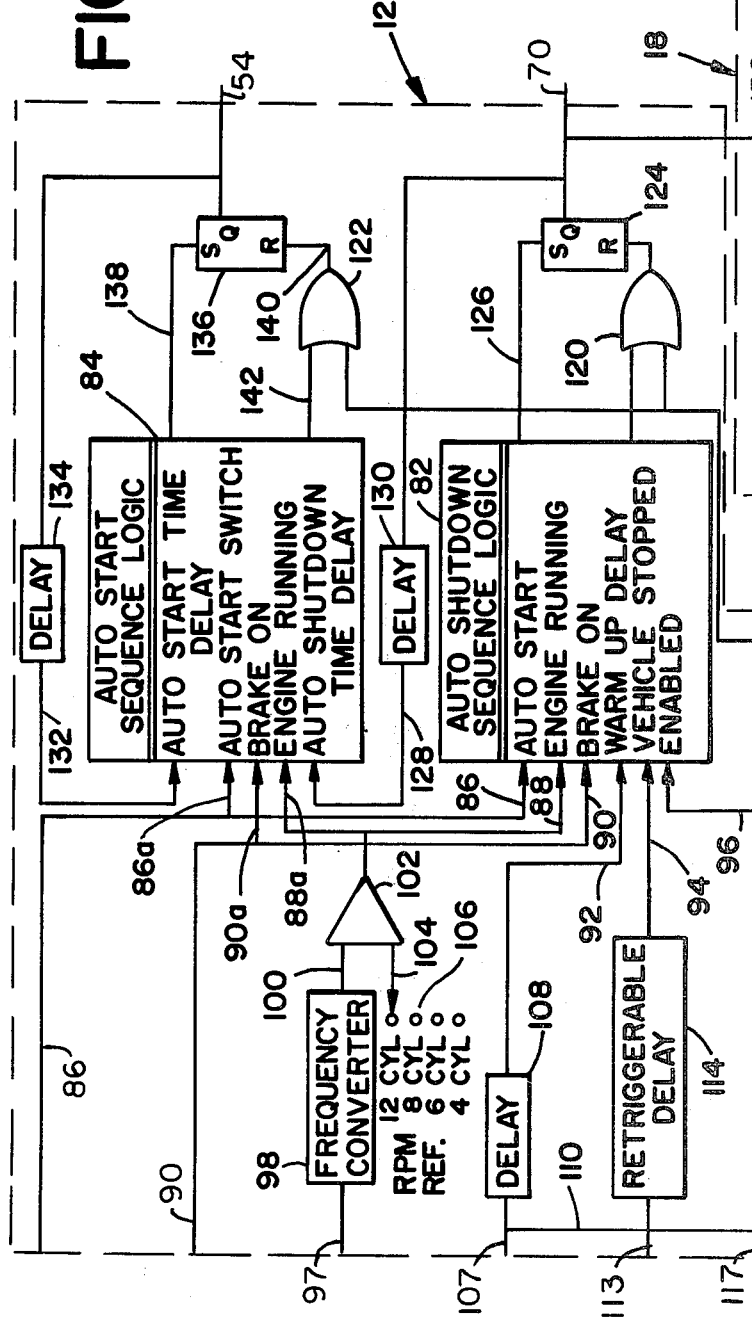
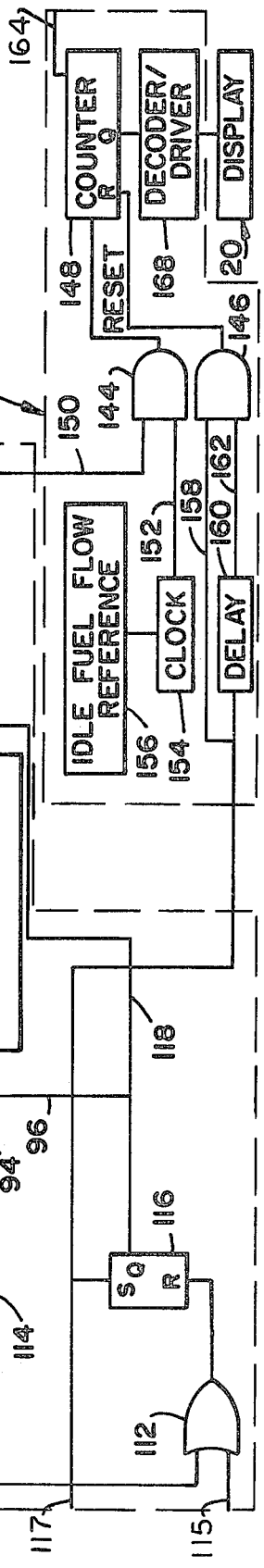

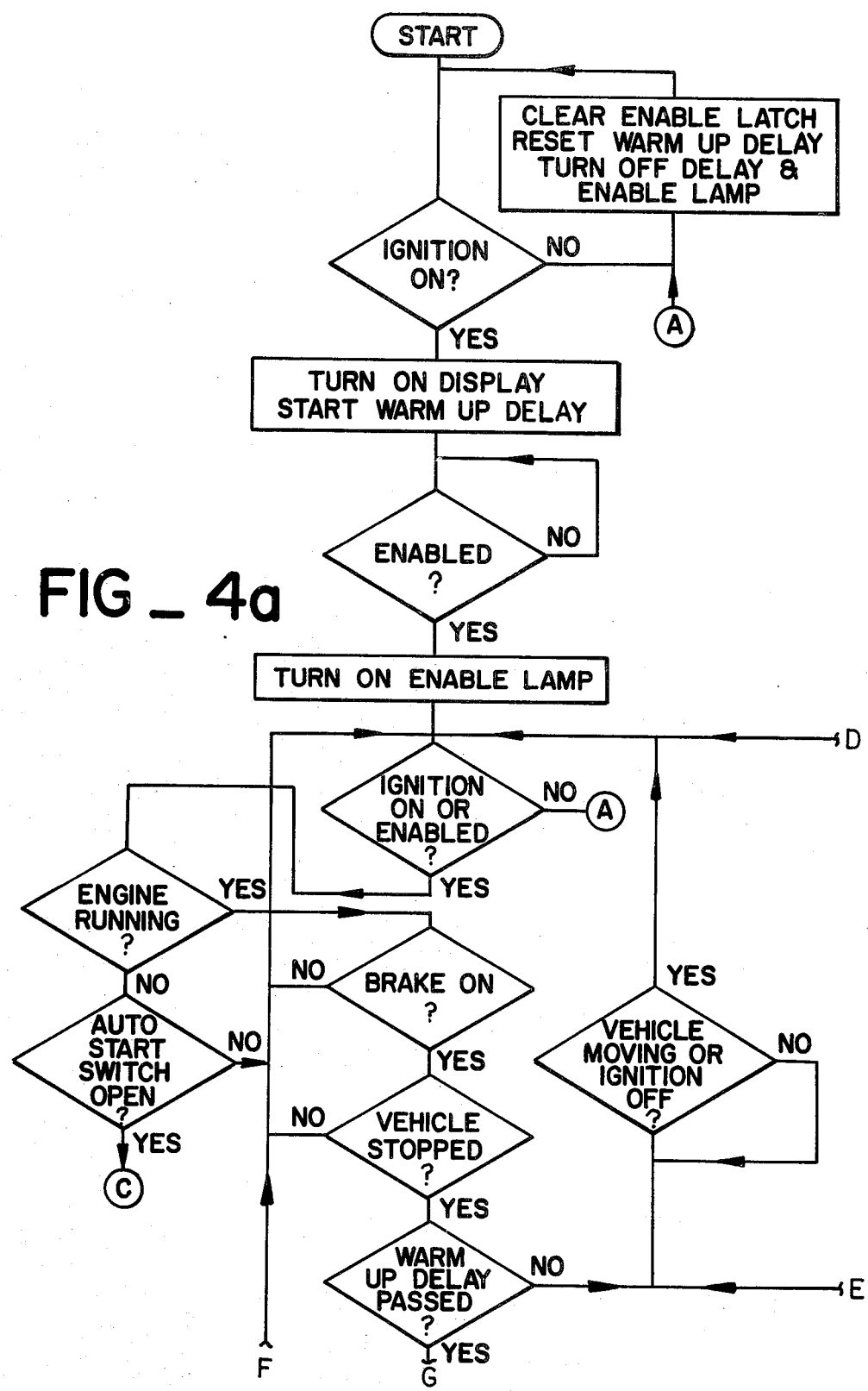
FIG_4a

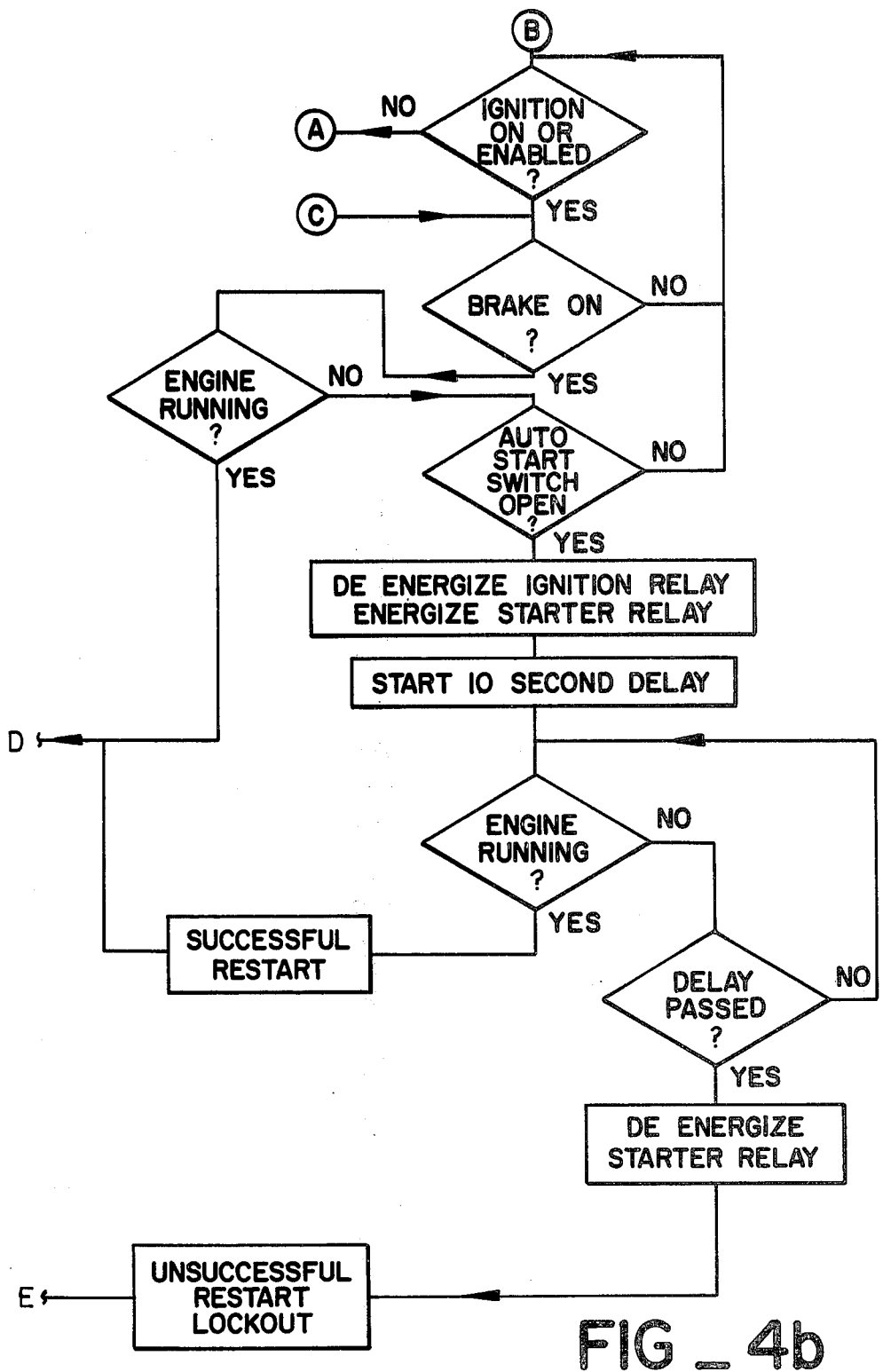
FIG_4b

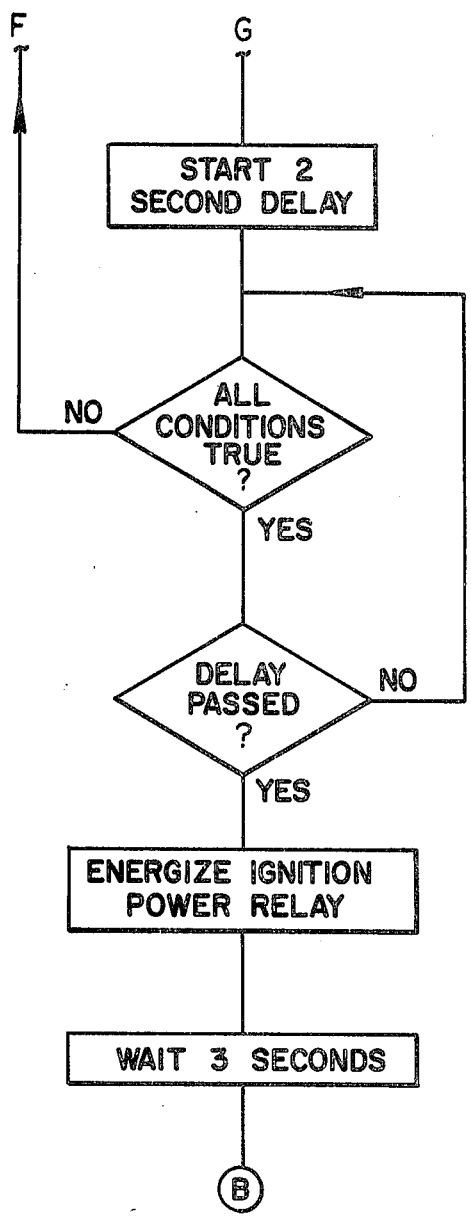
FIG _ 4c

STOP/START CONTROL SYSTEM FOR ENGINE

BACKGROUND OF THE INVENTION

This invention relates to a system for automatically stopping and restarting the internal combustion engine of a vehicle to conserve fuel when the vehicle is forced to stop intermittently for short periods of time. It also relates to such a system that measures and displays the amount of fuel saved by the automatic stopping and restarting operation.

In the normal day-to-day operation of automotive vehicles, such vehicles must often stop and remain stationary while their engine remains running. To conserve fuel during such stops, various schemes have been proposed for causing the engine to cease operation and then be restarted under certain operating conditions. Apparatus for accomplishing such engine operations is described in U.S. Pat. Nos. 3,731,108 and 4,006,723. Both of these prior systems are relatively complicated and require a relatively high level of manual control. For example, the U.S. Pat. No. 4,006,723 (Startomatic) patent discloses an apparatus utilizing relatively complicated circuitry comprised of a series of interconnected relays, switches, sensors and other elements, yet, in its operations, it requires manual actuation of a switch means for stopping the engine. In the U.S. Pat. No. 3,731,108 the vehicle operator is required to actuate switches on both the accelerator and the clutch before restarting a vehicle engine that has been previously stopped. The present invention provides a solution to the aforesaid problems with an improved, more versatile, and thus more effective, automatic engine stopping and starting system.

Another important feature of the present invention is that it provides an engine stop-start system which also measures and displays the amount of the fuel actually saved during the time that the engine is shut down for intermittent stopping periods. Thus, a vehicle owner can quickly ascertain the fuel being saved during a particular trip or over a certain time period.

It is, therefore, a general object of the invention to provide an improved system for automatically stopping and restarting an engine to conserve fuel at times it would ordinarily be running at idle speed.

Another object of the invention is to provide an engine stop/start system that will automatically calculate and display the amount of fuel saved during shutdown periods.

Another object of the invention is to provide an automatic engine stop/start system that is relatively simple but efficient, accurate and reliable and yet easy to install on a wide variety of conventional vehicles.

A more specific object of the invention is to provide an engine stop-restart system that will operate automatically to stop the vehicle engine when the vehicle is not moving, when its brake is on and a predetermined amount of time has elapsed after these events, which will restart automatically with the vehicle in gear or in the automatic "drive" position, when the vehicle accelerator is activated to close an auto start system, and which will compute and display the actual amount of fuel saved during the shutdown period.

SUMMARY OF THE INVENTION

Briefly described, the automatic engine stop-start system, according to the principles of the present invention, comprises a central control means or signal processor whose output is connected to a digital display that can be readily mounted on a vehicle. The central control means comprises a first logic section with logic circuitry that controls the automatic stop or shutdown sequence and a second logic section that controls the automatic start sequence. The first logic section has inputs connected to an enabling switch of the system, the vehicle ignition switch, a vehicle speed sensor, a brake switch, an engine on-off status sensor and an engine start switch. The second or automatic startup logic section has inputs connected to the engine start switch, the brake switch, the engine status sensor and fixed time delay feedback inputs from the outputs of both logic sections. The output of the automatic shutdown logic section is supplied to an ignition power control relay which operates to turn off the engine ignition coil or electronic ignition system. It also operates to start a counter means for a fuel-saved accumulator that computes and displays the amount of fuel which normally would have been consumed if the engine had not been shut off during a typical engine idle period for the vehicle. The output of the start sequence section operates a relay on the vehicle starter motor to restart the engine by actuation of the auto start switch which may be on the vehicle accelerator pedal. This output from the start sequence logic section is also furnished to the fuel-saved accumulator to provide a cutoff signal for its counter. Thus, in combination, the present invention provides an automatic apparatus adapted for installation in a vehicle with an internal combustion engine which will operate to: (1) shutdown the engine whenever the vehicle comes to a stop for a predetermined period of time that contemplates a period of engine idling; (2) restart the engine upon actuation of a conveniently operable auto start switch; and (3) calculate and display the amount of fuel saved during normal idling periods as a result of the automatic shutdown and restart procedure. For most passenger vehicles, the fuel saved by the present invention will be significant over a period of time, thereby providing a substantial contribution, not only to fuel conservation in general, but also, monetary savings to individual users.

Other objects, advantages and features of the invention will become apparent from the following detailed description of one embodiment thereof, presented in conjunction with the accompanying drawing.

BRIEF DESCRIPTION OF THE DRAWING

FIG. 2 is a more detailed block diagram of the control logic section of the engine stop/start system shown in FIG. 1;

FIG. 3 is a more detailed block diagram of the fuel-saved accumulator and display section of the system of FIG. 1; and FIGS. 4a to 4c together comprises a schematic flow diagram representing the logic program for the shutdown and restart sequences.

DETAILED DESCRIPTION OF EMBODIMENT

Figure 1:
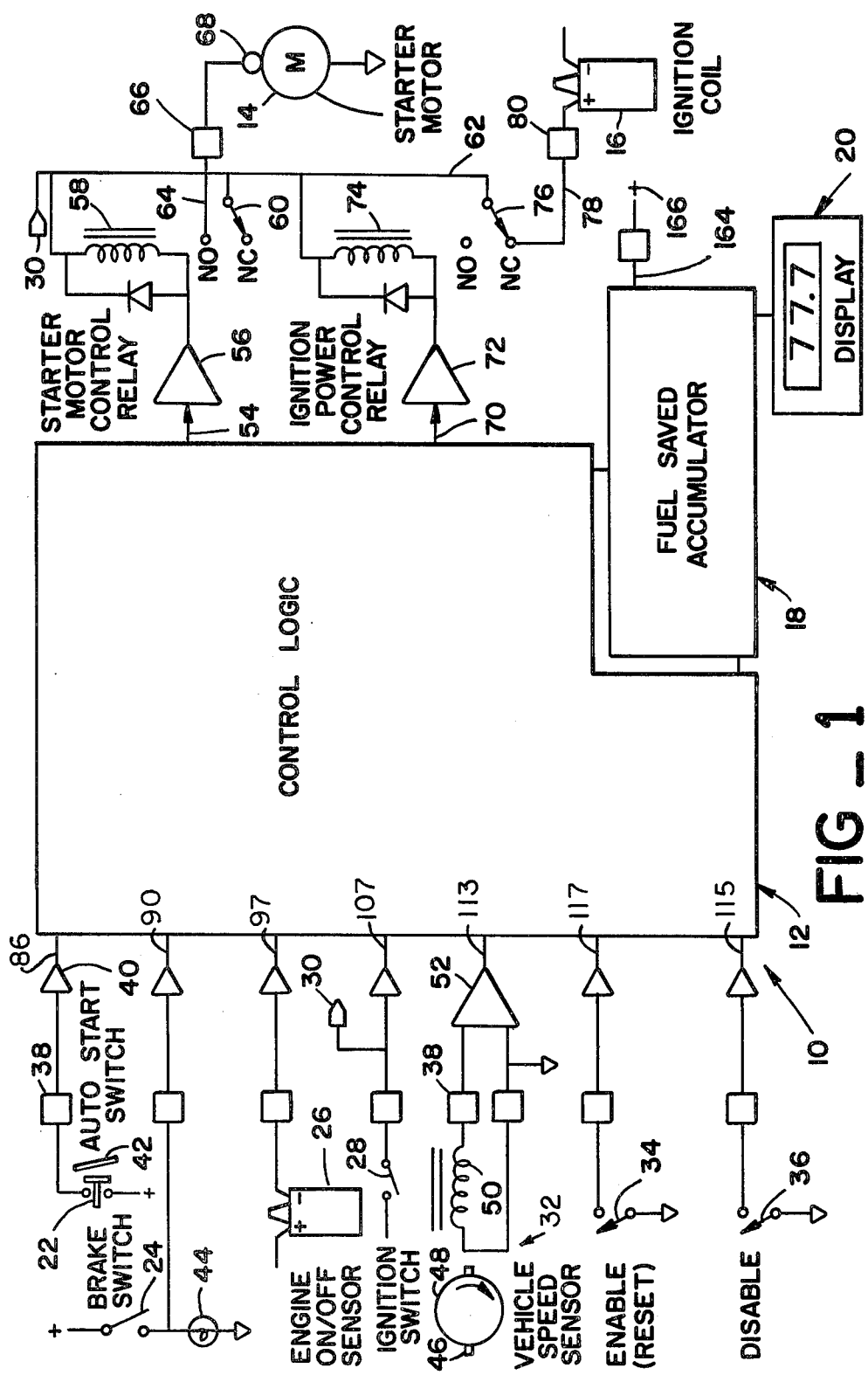
FIG. 1 is a general block diagram of the automatic engine stop/start system according to the present invention.

With reference to the drawing, FIG. 1 shows in block diagram form, an engine stop/start system 10 embodying the principles of the present invention. In general, the system comprises a central control means 12 which is connected to a plurality of switches and sensors on the vehicle on which the system is installed. This control means provides outputs to the engine starter motor 14 and to its ignition coil or electronic ignition system 16, and it is also connected with, and provides input signals to, a "fuel-saved" accumulator or means 18 connected to a display means 20. The central control means and the calculator means may be combined on one solid state integrated circuit microprocessor device whose characteristics will be described in detail later on. Thus, when installed on a vehicle, the engine stop/start system 10, according to the present invention, will operate automatically to shut down the vehicle engine when the vehicle comes to a stop with the engine idling; to restart the engine when the operator steps on the engine accelerator; and to calculate and display the amount of gas saved during the shutdown period.

As shown in FIG. 1, the input leads to the control means (represented by a single block 12) are connected to an auto start switch 22, a brake switch 24, an engine on/off sensor 26, the vehicle standard ignition switch 28 (connected to an ignition power source 30) a vehicle speed sensor 32, a system enable and reset switch 34 and a system disable switch 36. A separate lead from each of these switches and sensors is connected through an appropriate terminal connector designated by the numeral 38 and then through an input buffer circuit 40. These buffer circuits include capacitors and transistors connected in the well known manner to filter, amplify and properly condition the various pulse signals for processing by the control means.

The auto start switch 22 may be a simple push button switch actuated by the engine accelerator pedal 42 to produce a pulse from the vehicle battery. The input pulse from the brake switch can be supplied from the circuit for the vehicle brake light 44. The engine on-off sensor is a conventional voltage sensing device which may be attached to the vehicle engine ignition coil 26 or to its electronic ignition system to sense and transmit a signal via a lead 97 when the engine is running. The signal from the ignition switch 28 is supplied to the control means 12 via a lead 107.

The vehicle speed sensor 32 can be of any suitable type that will provide pulses at a frequency proportional to the vehicle speed. For example, a type of speed sensor may be used, as shown schematically in FIG. 1, wherein a pair of magnets 46 are fixed to the engine drive shaft 48 (or to any rotating drive component such as a trans-axle for front wheel drive vehicles) and near a sensing coil 50 fixed to the vehicle. In this speed sensor, the pulses sensed by the coil 50 pass through the interconnect terminals to a high impedance interface circuit, preferably comprised of a Schmitt trigger circuit 52 that strengthens the speed pulses, eliminates spurious outside signals, and produces an output signal, via lead 113, only when the vehicle is moving.

The enable and reset switch 34 and the disable switch 36 are manually operable switches that may be supplied as a single unit, such as a conventional toggle or rocker type switch, preferably located adjacent the display for the system. The enable signal is supplied to the control means 12 via a lead 117 and the disable signal is supplied via a lead 115.

One output lead 54 from the control means 12 is fed through a relay driver 56 to the starter motor control relay 58 for the starter motor 14 of the vehicle engine. This relay is energized by the auto start circuit and bypasses the normal starter switches and transmission interlocks commonly used on vehicles. It isolates the control circuit from the starter solenoid and operates by closing a switch 60 which is connected to a common lead 62 from the vehicle ignition power source. When closed, power is supplied through a lead 64 and a terminal connector 66 direct to the starter motor solenoid 68.

Another output lead 70 from the control means is fed through a relay driver 72 to another relay 74 which is the ignition power control relay for controlling the engine shutdown. This relay controls the operation of a switch arm 76, connected to the common power lead 62, between on-off contacts, the "on" contact being connected by a lead 78 through a terminal connector 80 to the engine ignition coil 16. When the switch arm 76 is moved to the "off" contact, the engine ignition system is disconnected, and the engine stops. Thus, this relay 74 controls the power that is applied to the ignition coil or solid state ignition system of the vehicle. When the auto shutdown circuit wants to turn off the engine, it energizes this relay which then breaks the circuit from the ignition switch to the ignition system. When the auto start circuit wants to restart the engine, it de-energizes this relay which re-applies power to the vehicle ignition system. In the default mode, this relay does not disturb the normal ignition system operation.

As shown in FIG. 2, the control logic means 12 includes essentially two sections, 82 and 84, the first of which controls the automatic engine shutdown portion of the present system.

This first logic section comprises a multiple input AND gate which receives input pulses from the auto start switch 22 via a lead 86, an engine on/off comparator 102 via a lead 88, the brake switch 24 via a lead 90, a warm-up delay 108 via a lead 92, a speed sensor delay 114 via a lead 94, and an enable latch 116 via a lead 96.

The buffered signal from the engine on/off sensor 26 is supplied to a frequency converter 98 via lead 97, whose output through a lead 100, is supplied as one input to the comparator 102. This frequency converter converts the pulses from the engine tachometer or ignition coil, to either an analog voltage or to a multi-bit digital signal, depending on its type. The other input to the comparator through a lead 104 is a preset reference voltage or coded bit digital signal from a reference voltage source 106, which is proportional to the number of cylinders for the engine, (i.e., 4, 6, 8 or 12 cylinders). The comparator circuit is designed so that it will produce an output pulse to lead 88, only when the motor speed exceeds the reference level or signal, so that no output will be produced when the starter is merely cranking the engine.

The buffered signal from the ignition switch 28 is supplied via a lead 107 to the delay means 108 of the control logic circuit to provide a predetermined warm-up delay (e.g., 3 minutes). A branch lead 110 also supplies the ignition input signal to a two input "OR" gate 112 whose other input is from the disable switch 36 via lead 115. The output of this latter gate is supplied to one terminal (R) of an enable latch 116 whose other input (S) is connected to the enable (Reset) input lead 117. The output from latch 116, furnished via the lead 96 as one input to the first logic section, is also supplied via a lead 118 as one input to a second "OR" gate 120 and to a third "OR" gate 122. The second "OR" gate also receives an input from the output of the first logic section 82 and its output is furnished to one terminal (R) of an automatic shutdown latch 124. The other terminal (S) of this latch is connected via a lead 126 to another output from the first logic section.

The buffered input from the vehicle speed sensor 32 is furnished from the Schmitt trigger circuit 52 via lead 113 to a second retriggerable delay means 114 having a relatively short delay (e.g., 2 seconds).

The second logic section 84 of the control logic means controls the automatic startup sequence and comprises a multi-input "AND" gate which receives inputs from the autostart switch 22 via a lead 86a, the brake switch 24 via a lead 90a and the engine on/off comparator 102 via a lead 88a. This "AND" gate also receives a short delay input (e.g., 2 seconds) via a feedback lead 128 from the output of the auto shutdown latch 124 through a suitable delay means 130. Another somewhat longer delay pulse is supplied to the second logic section via a feedback lead 132 from the output of another delay means 134 connected to the output of an autostart latch 136. This latter latch receives an input to its (S) terminal via one output lead 138 from the second logic section and an input to its (R) terminal from the output 140 of the third "OR" gate 122. As previously described, this latter "OR" gate receives one input from the enable latch 116 and a second input from an output lead 142 from the second logic section.

With reference to FIG. 3, the "fuel-saved" calculator or accumulator 18 comprises a pair of "AND" gates 144 and 146 whose outputs are both connected to a counter 148. The first AND gate 144 has one input connected via a lead 150 to the output lead 70 from the auto shutdown latch 124. The second input to the AND gate 144 is supplied by a lead 152 from a programmable clock 154. The clock rate is preset and determined by a suitable idle fuel flow reference, indicated generally by the block 156. Electronically, this reference may be in the form of a parallel binary number comprised of an array of switches. The two inputs to the second AND gate 146 originate from the enable (reset) switch 34. One of these inputs is connected via a lead 158 directly to the switch 34, and the other is passed through a 3 second delay means 160 via an input lead 162. The counter 148 is driven by the output from the first AND gate 144 and receives power via a lead 164 from a battery 166. The output from the second AND gate 146 provides a path for a reset pulse that will set the counter at zero. The output of the counter is supplied to a decoder-driver 168 of the conventional type that provides an interface with a typical digital display 20. The latter may be either the light emitting diode (LED), liquid crystal (LCD), or vacuum fluorescent (VF) type and may have any desired number of digits.

Typical operation of the system 10 according to the invention, when installed in an automobile, may be described as follows:

When the engine of the vehicle is first started in its cold condition, starting is normally done in the conventional manner by turning on the ignition switch and energizing the starter manually. At this point, the enable switch 34 for the system can also be turned on. However, the system will not commence to be operable until after the three minute warm-up delay 108 has elapsed. Thus, if the engine should stall because of being cold during the initial warm-up period, the system will not cause an automatic start up at this point.

Now, if the vehicle is brought to a stop, as for example, at a long traffic light, an automatic engine shutdown will occur, since: (1) the ignition switch 28 is on; (2) the enable latch 116 is in the "on" state; (3) the brake was applied to activate the brake switch 24; and (4) the warm-up time delay 108 has passed its three minute period and (5) the vehicle has stopped, as sensed by the speed sensor 32 and the two second time delay 114 has passed.

When all of the aforesaid conditions are sensed and provide inputs to the first logic section 82, it produces outputs to the two terminals of the auto shutdown latch 124. This provides a signal through the relay driver 72 to the ignition power control relay 74 which operates switch 76 to disconnect or disable the ignition coil or electronic ignition system 16, thereby stopping the engine.

Once the engine has been shutdown (by removing power from the ignition circuit) it cannot be automatically restarted for at least two seconds. This "automatic shutdown time delay" 130 allows time for the engine rotation to stop, thereby preventing damage to the starter motor system. If at any time during the testing of the above conditions the ignition is turned off, then the display is turned off, the unit is disabled and the warm-up time delay is set again.

Thus, while the vehicle is stopped and waiting for a signal to start again, it is not consuming fuel, but the fuel saved accumulator is calculating the amount being saved due to the shutdown.

When desired, engine restart will be accomplished, following its automatic shutdown, after the following sequence of events has occurred and the inputs derived therefrom have been supplied to the second logic section 84: (Note: it is assumed that the ignition switch has remained in the "on" position, thereby supplying power to all the necessary components of the system). (1) automatic engine shutdown providing a signal from the output of the first logic section with a two second delay element 130 and lead 128; (2) the brake is on, providing an input through lead 90a, (this is an optional input that is not absolutely required, but assures greater safety and control of the vehicle during restart); (3) the engine is not already running, as indicated by the input on lead 88a from the engine on/off sensor 26, and (4) the auto start switch 22 has been closed as by stepping on the accelerator pedal 42 to provide an input through the lead 86a.

If the aforesaid inputs to the second logic section 84 are provided in the above sequence, outputs are provided to the auto start latch 136, which provides a signal through the relay driver 56 to the starter motor control relay 58. This operates to produce power to the starter motor solenoid 68 and motor 14 to start the engine.

The starter motor will remain engaged until either the engine starts, as signified by an increase in engine RPM above cranking speed, or the automatic starter time delay 134, of approximately 10 seconds, has passed. If the engine starts before the 10 second time period has passed, the control circuit 84 will be readied for another automatic shutdown. If the engine did not start the first time, the system will not attempt a second restart. This must then be done manually.

The present system 10 will start an automatic transmission vehicle with the gear selector in D or L. This saves the operator the time required to shift the transmission into gear after the automatic start cycle is complete.

During the time between automatic shutdown and automatic start-up, the present invention also keeps track of the fuel that would have been consumed by letting the engine idle. Since no fuel is consumed with the engine stopped, this reading is the amount of fuel saved by using the system 10. The amount of fuel that would have been consumed is computed by multiplying the average fuel consumption at idle in gallons per hour by the number of hours that the engine is stopped. The average idle fuel consumption could be computed by measuring the actual fuel flow with an accurate digital flow sensor during the periods when the engine is running and the vehicle is not moving, to obtain an average idling rate, or it can be calculated from the average fuel efficiency in miles per gallon of the vehicle. In the embodiment illustrated, a preset fuel flow reference valve is preselected and set in the element 156 which then supplies the proportionate input to the programmable clock 154 that in turn supplies one input to the AND gate 144. When automatic shutdown occurs, a second input is supplied to AND gate 144 which thus enables a counter 148. The latter also includes a nonvolatile memory of previous fuel savings which is updated every time the system 10 is called upon to shut down the engine. The counter output is supplied through the decoder-driver to the display 20. This readout circuitry provides the vehicle operator with the contents of the accumulator 18 and reminds him of the amount of fuel he has saved by using the system 10. When desired, the operator can clear the contents of the accumulator and start a new running total of the amount of fuel saved by actuating the enable (reset) switch 34 which operates to send a pulse through the delay 160 and the AND gate 146 to the counter.

In order to conserve space and also assure operating efficiency at low power requirements, the control logic 12 and the fuel-saved accumulator 18 are preferably implemented by one solid state, 4-bit electronic microprocessor device. For example, a National Semiconductor "control oriented processor" designated COP 41OL, may be used to provide the logic, memory and computing requirements of the present system, as shown in FIGS. 2 and 3. Such as semiconductor processor may be programmed to provide both the engine shutdown and engine start up sequence operations as previously described.

A schematic diagram or flow chart representing a typical program for implementing the features of the invention is illustrated in FIGS. 4a–4c. (This diagram is shown on three sheets because of space limitations, and the connecting lines between sheets are indicated by the letters D, E, F and G.) The various conditions providing the "yes" and "no" logic decisions are captioned in the well known manner using standard symbology so as to be readily understood by those familiar with the art.

While the program shown illustrates one embodiment of a microprocessor control scheme, it should be understood that variations of this program and other forms of processors or logic and control devices could be used within the scope of the invention. The automatic shutdown and restart controls, as previously stated, function in combination with the fuel-saved accumulator 18 and its display 20 to provide an ever available readout of the fuel actually saved by the stop/start system.

Thus, to those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. For use with a vehicle having an internal combustion engine with a drive shaft, a starter motor, an ignition system with an ignition switch and a battery, a brake means and an accelerator means, a system for automatically controlling the shutdown and restarting of the engine in order to conserve fuel at times when the vehicle would be otherwise stopped with the engine running at idle speed, said system comprising:

an enable switch connected to said battery for turning said system "on";

first control means for producing a first series of input signals when the engine is running and the vehicle is stopped;

a first logic means responsive to said input signals from said first control means to provide an output;

means responsive to the output from said first logic means for disabling the ignition system to thereby stop the engine;

second control means, including a manually operated auto start switch for producing a second series of input signal when the engine is off with the vehicle stopped;

a second logic means responsive to said second control means to provide an output for controlling restarting of the engine;

means responsive to the output of said second logic means for activating the starter motor to start the engine;

means responsive to said output from said first logic means for computing the amount of fuel saved during an engine shutdown period between an automatic engine stop and an engine restart by the system;

means for providing an engine idle fuel flow rate reference;

clock means connected to said reference means and operable at a rate proportional thereto;

counter means driven by said clock means for producing an output proportional to the accumulated fuel saved;

gate means connected between said clock means and said counter means and responsive to the output from said first logic means for controlling said counter means; and display means for providing a visual representation of the accumulated fuel saved from said counter means.

2. The system as described in claim 1 including means in said fuel saved accumulator responsive to said enable switch when it is moved to a reset position to produce a signal for clearing said counter.

3. An automatic stop and restart control system for a vehicle provided with an internal combustion engine having an ignition circuit, a battery power supply and a starter motor, comprising:

first control means for automatically causing an engine shutdown when the vehicle is stopped with the engine at idle speed;

second control means for restarting the engine following a period of time after an automatic engine shutdown;

accumulating means for computing the amount of fuel being saved during the engine shutdown time period; and means for displaying the computed amount of fuel saved after the engine has been restarted.

4. The system as described in claim 3 wherein said first and second control means and said accumulating means include logic and memory sections on an integrated circuit microprocessor device.

* * * * *